US010353761B2

United States Patent
Sogorka et al.

(10) Patent No.: US 10,353,761 B2
(45) Date of Patent: Jul. 16, 2019

(54) ASYNCHRONOUS SENSORS

(71) Applicant: BLACK KNIGHT IP HOLDING COMPANY, LLC, Jacksonville, FL (US)

(72) Inventors: Daniel Brian Sogorka, Encinitas, CA (US); Mark Richard Johnson, Newport Beach, CA (US); John David Holbrook, Suwanee, GA (US); Jeffrey Albert Sanderson, Coto De Caza, CA (US); Ronald Lynn Frazier, Villa Park, CA (US); Donald P. Smith, Houston, TX (US)

(73) Assignee: Black Knight IP Holding Company, LLC, Jacksonville, FL (US)

( * ) Notice: Subject to any disclaimer, the term of this patent is extended or adjusted under 35 U.S.C. 154(b) by 584 days.

(21) Appl. No.: 15/053,700

(22) Filed: Feb. 25, 2016

(65) Prior Publication Data

US 2016/0299803 A1    Oct. 13, 2016

Related U.S. Application Data

(63) Continuation-in-part of application No. 13/675,195, filed on Nov. 13, 2012, which is a (Continued)

(51) Int. Cl.
*G06F 16/00* (2019.01)
*G06F 11/07* (2006.01)
(Continued)

(52) U.S. Cl.
CPC ........ *G06F 11/079* (2013.01); *G06F 11/0709* (2013.01); *G06F 11/0751* (2013.01);
(Continued)

(58) Field of Classification Search
CPC .......................... G06F 17/30303; G06F 16/215
See application file for complete search history.

(56) References Cited

U.S. PATENT DOCUMENTS

| 5,084,819 A | 1/1992 | Dewey |
| 6,289,340 B1 | 9/2001 | Puram et al. |

(Continued)

OTHER PUBLICATIONS

A La Mode, "Calyx Point® users can now order appraisals directly from the LOS, through a la mode's Mercury Network, eliminating costly errors and delays," Nov. 9, 2010. Retrieved Oct. 16, 2018, accessible at <<https://web.archive.org/web/20101213064431/http://www.mercuryvmp.com:80/news/release/calyx_point_users_can_now_order_appraisals_directly_from_the_los_through_a_>>.

*Primary Examiner* — Grace Park
(74) *Attorney, Agent, or Firm* — Baker & McKenzie LLP

(57) ABSTRACT

Described herein are apparatuses, methods, and computer readable media for asynchronous sensing and/or validating of data using a first sensor and a second sensor for a purpose of transforming input data into validated output data when at least one attribute of external data or the input data, as determined by a sensor, is missing. The external data is associated with the input data and is used for determining a set of attributes for the first sensor. The asynchronous sensing and/or validating of the input data enables faster transforming of the input data into the validated output data.

20 Claims, 2 Drawing Sheets

Related U.S. Application Data continuation-in-part of application No. 13/458,893, filed on Apr. 27, 2012.

(60) Provisional application No. 61/480,909, filed on Apr. 29, 2011.

(51) Int. Cl.
*H04L 29/08* (2006.01)
*G06F 16/215* (2019.01)
*G06Q 30/02* (2012.01)

(52) U.S. Cl.
CPC ....... *G06F 16/215* (2019.01); *G06Q 30/0278* (2013.01); *H04L 67/06* (2013.01)

(56) References Cited

U.S. PATENT DOCUMENTS

| | | |
|---|---|---|
| 6,609,118 B1 | 8/2003 | Khedkar et al. |
| 7,212,995 B2 | 5/2007 | Schulkins |
| 7,287,008 B1 | 10/2007 | Mahoney et al. |
| 7,379,912 B1 | 5/2008 | Camin et al. |
| 7,499,882 B2 | 3/2009 | Cole |
| 7,599,882 B2 | 10/2009 | Cagan |
| 7,987,124 B1 | 7/2011 | Holden et al. |
| 2002/0035520 A1 | 3/2002 | Weiss |
| 2002/0091630 A1 | 7/2002 | Inoue |
| 2003/0149656 A1 | 8/2003 | Magruder et al. |
| 2004/0078318 A1 | 4/2004 | Miller |
| 2004/0153330 A1 | 8/2004 | Miller et al. |
| 2004/0220872 A1 | 11/2004 | Pollock |
| 2005/0108123 A1 | 5/2005 | Schneider |
| 2006/0136330 A1 | 6/2006 | DeRoy et al. |
| 2006/0224499 A1 | 10/2006 | Graboske et al. |
| 2007/0067180 A1 | 3/2007 | James et al. |
| 2007/0204010 A1 | 8/2007 | Sah et al. |
| 2008/0004893 A1 | 1/2008 | Graboske |
| 2008/0071703 A1 | 3/2008 | Evans |
| 2008/0103963 A1 | 5/2008 | Mahoney et al. |
| 2008/0162224 A1 | 7/2008 | Coon et al. |
| 2008/0235288 A1* | 9/2008 | Ben Harush ...... G06F 17/30306 |
| 2010/0117856 A1* | 5/2010 | Sonderegger .......... G06Q 10/06 340/870.02 |
| 2010/0205084 A1 | 8/2010 | Misraje et al. |

\* cited by examiner

ASYNCHRONOUS SENSORS

TECHNICAL FIELD

The present application generally relates to sensors.

BACKGROUND

There is a need to validate the integrity of data when transforming the data from one form to another. The challenge to validate the integrity of this data is even greater when at least some portion of the data that needs to be transformed or data that aids in transforming is missing. Therefore, there is a need for a new technological solution.

SUMMARY

This disclosure describes a system for asynchronous sensing and/or validating of data using a first sensor and a second sensor for a purpose of transforming input data into validated output data when at least one attribute of external data or the input data is missing. The external data is associated with the input data and is used for determining a set of attributes for the first sensor. The asynchronous sensing and/or validating of the input data enables faster transforming of the input data into the validated output data.

In some embodiments, the system comprises an input data communication interface for establishing a first connection to an input data system, and receiving, on the first connection, input data from the input data system.

In some embodiments, the system further comprises an external data communication interface for establishing a second connection to an external data system, and receiving, on the second connection, external data from the external data system, wherein the external data is associated with the input data.

In some embodiments, the system further comprises a pre-validation sensor for sensing a first pre-validation attribute associated with the input data.

In some embodiments, the system further comprises a missing validation sensor for sensing a first missing attribute associated with the external data or the input data.

In some embodiments, the system further comprises a first validation sensor for sensing a first validation attribute associated with pre-validated input data.

In some embodiments, the system further comprises a second validation sensor for sensing a second validation attribute associated with the pre-validated input data. The second validation attribute may be sensed by the second validation sensor asynchronously with the sensing of the first validation attribute by the first validation sensor.

In some embodiments, the system further comprises a chipset disposed in the housing and interfaced with a processor. The chipset includes hardware for supporting the first connection to the input data system, and the second connection to the external data system.

In some embodiments, the system further comprises a processor configured for determining, using the pre-validation sensor, a first pre-validation attribute associated with the input data, pre-validating, based on the first pre-validation attribute, the input data, determining, using the missing validation sensor, a first missing attribute associated with the external data or the input data, determining, based on the first missing attribute, an insensible attribute associated with the first validation sensor, determining, using the first validation sensor, a first set of validation attributes associated with the pre-validated input data, the first set of validation attributes not comprising the insensible attribute, determining, using the second validation sensor, a second set of validation attributes associated with the pre-validated input data, validating, based on the first set of validation attributes, the pre-validated input data, and validating, based on the second set of validation attributes and asynchronously with the validating based on the first set of validation attributes, the pre-validated input data.

In other embodiments, the validating of the pre-validated input data based on the first set of validation attributes is executed synchronously with the validating of the pre-validated input data based on the second set of validation attributes.

In some embodiments, the system further comprises an output data communication interface for establishing a third connection to an output data system, and transmitting, on the third connection, output data to the output data system. In some embodiments, the hardware further supports a third connection to the output data system.

In some embodiments, the first connection and the third connection comprise the same connection, and the input data system and the output data system comprise the same data system.

In some embodiments, the input data communication interface and the output data communication interface comprise the same data communication interface In some embodiments, the first connection and the second connection comprise the same connection, and the input data system and the external data system comprise the same data system.

In some embodiments, the input data communication interface and the external data communication interface comprise the same data communication interface.

In some embodiments, the processor is further configured for validating, based on the first missing attribute, the pre-validated input data.

In some embodiments, the processor is further configured for determining, based on the first missing attribute, a quality of the validated data.

In some embodiments, the processor is further configured for indicating, using a graphical indicator, a degree of validity of the validated data. In some embodiments, the graphical indicator may be a red flag.

In some embodiments, the input data comprises at least some external data.

In some embodiments, no dependency exists between the first sensor and the second sensor. This enables asynchronous sensing of data using the first sensor and the second sensor. As used herein, asynchronous sensing of data using a first sensor and a second sensor may refer to parallel sensing of data using the first sensor and the second sensor. In other embodiments, a dependency may exist between the first sensor and the second sensor causing either the first sensor or the second sensor to sense before the other sensor (a synchronous embodiment). In such embodiments, the validation of the pre-validated input data based on the first validation attribute (sensed by the first sensor) and the validation of the pre-validated input data based on the second validation attribute (sensed by the second sensor) may either be synchronous (serial) or asynchronous (parallel).

In some embodiments, the processor is further configured for integrating the validated data based on the first set of validation attributes and the validated data based on the second set of validation attributes.

In some embodiments, the processor is further configured for requesting and receiving the external data based on the input data.

In some embodiments, a method is provided for asynchronous sensing and/or validating of data using a first sensor and a second sensor for a purpose of transforming input data into validated output data when at least one attribute of external data or the input data is missing.

In some embodiments, a non-transitory computer readable medium for asynchronous sensing and/or validating of data using a first sensor and a second sensor for a purpose of transforming input data into validated output data when at least one attribute of external data or the input data is missing. The non-transitory computer readable medium may comprise code, which when executed by one or more processors of a computing device, causes the computing device to perform the various steps described herein.

BRIEF DESCRIPTION OF THE DRAWINGS

Reference is now made to the following detailed description, taken in conjunction with the accompanying drawings. It is emphasized that various features may not be drawn to scale and the dimensions of various features may be arbitrarily increased or reduced for clarity of discussion. Further, some components may be omitted in certain figures for clarity of discussion.

Although similar reference numbers may be used to refer to similar elements for convenience, it can be appreciated that each of the various example implementations may be considered distinct variations.

DETAILED DESCRIPTION

Figure 1:
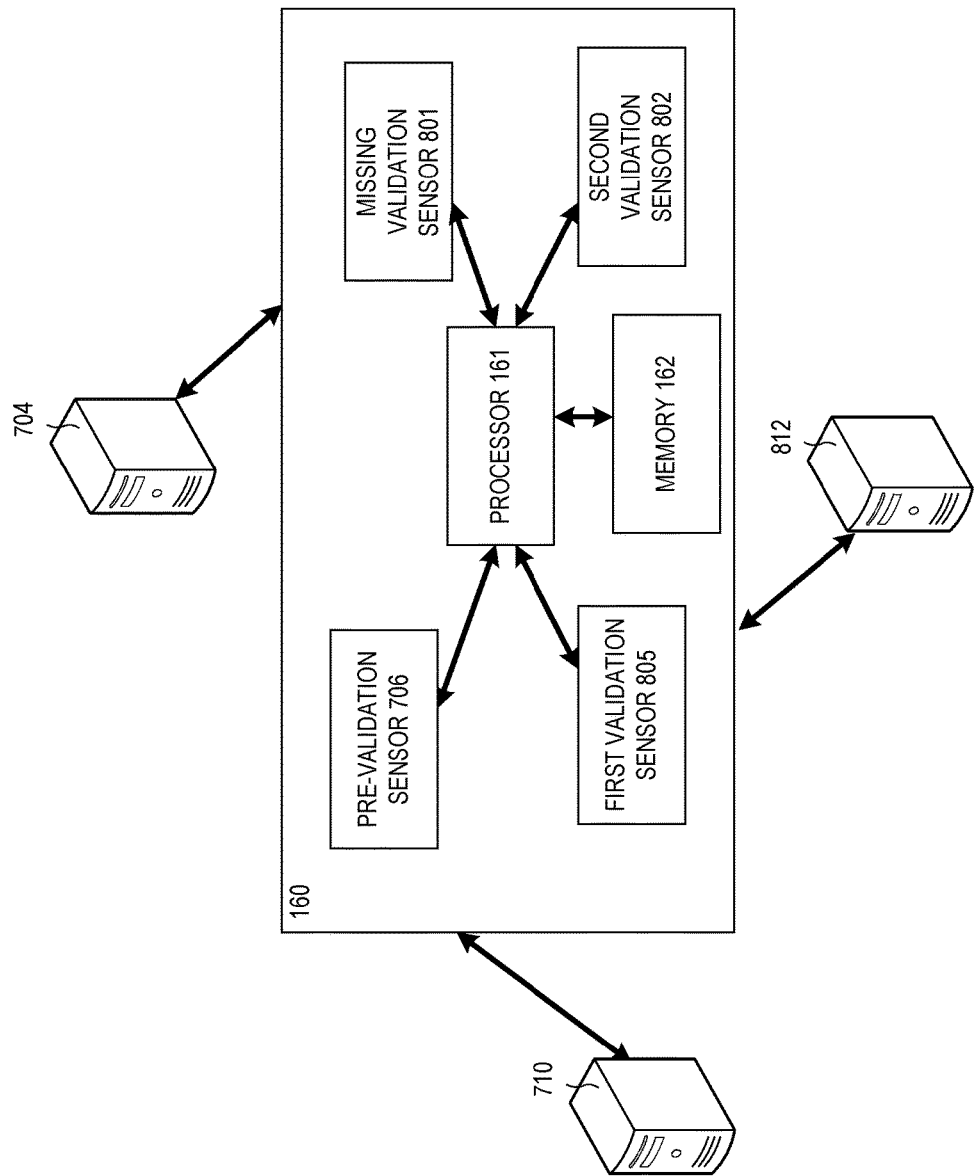
FIG. 1 is a block diagram illustrating a system environment for asynchronous sensing and/or validating of data using a first sensor and a second sensor for a purpose of transforming input data into validated output data when at least one attribute of external data or the input data is missing, in accordance with some embodiments of the disclosure.

FIG. 1 is a block diagram illustrating a system environment for asynchronous sensing and/or validating of data using a first sensor and a second sensor for a purpose of transforming input data into validated output data when at least one attribute of external data or the input data is missing. FIG. 1 presents a computing system 160. The computing system comprises an input data communication interface for communicating with an input data system 704, an external data communication interface for communicating with an external data system 710, and an output data communication interface for communicating with an output data system 812. In some embodiments, the input data communication interface, the external data communication interface, and the output data communication interface may either be separate interfaces or are the same interface. In some embodiments, the input data system 704, the external data system 710, and the output data system 812 may either be separate systems or are the same system.

The computing system 160 may comprise a processor 161, a memory 162, and an input/output module (e.g., for inputting data into the computing system 160 and outputting data from the computing system 160). In some embodiments, the computing device 160 may comprise a pre-validation sensor 706, a missing validation sensor 801, a first validation sensor 805, and a second validation sensor 802. Any of the sensors described herein may be specialized sensors or non-specialized sensors. In some embodiments, a sensor may be a rules-based sensor that applies a set of rules to data to determine whether the data has one or more attributes. In some embodiments, the sensor may also be referred to as a probe, a rules-based probe, a rules module, etc. In some embodiments, one or more of these sensors may be located in the processor 161 and/or the memory 162. The memory 162 may comprise instructions or rules. In other embodiments, the pre-validation sensor 706, the missing validation sensor 801, the first validation sensor 805, and the second validation sensor 802 may be separate modules located outside the memory 162 or the processor 161. In still other embodiments, the pre-validation sensor 706, the missing validation sensor 801, the first validation sensor 805, and the second validation sensor 802 may be located outside the computing system 160. In some embodiments, the pre-validation sensor 706, the missing validation sensor 801, the first validation sensor 805, and the second validation sensor 802 may comprise a single sensor. The sensors may either be hardware sensors or software sensors.

Any computing system described herein can operate as software executing on a computer which may include one or more processors or CPUs and one or more types of memory. Each memory preferably includes a removable memory device. Each processor may be comprised of one or more components configured as a single unit. Alternatively, when of a multi-component form, a processor may have one or more components located remotely relative to the others. One or more components of each processor may be of the electronic variety defining digital circuitry, analog circuitry, or both.

Each memory (removable or generic) is one form of a computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

Computing system 160 represents a "computer" in the generic sense and may be a single, physical, computing device such as a desktop computer, a laptop computer, or composed of multiple devices of the same type such as a group of servers operating as one device in a networked cluster, or a heterogeneous combination of different computing devices also linked together by a network and operating as one computer. Thus computing system 160 may be composed of one or more physical computing devices having one or more processors and memory as described above. The computing system 160 may also include a virtual computing platform having an unknown or fluctuating number of physical processors and memory devices supporting the operation of the systems described above. Likewise, the computing system 160 may be located in one geographical location or spread across several widely scattered locations with multiple processors linked together to operate as a single computer connected by a network. Just as the concept of a computer is not limited to a single physical device, so also the concept of a "processor" is not limited to a single physical logic circuit or package of circuits but includes one or more such circuits or circuit packages possibly contained within across multiple computing machines in various physical locations. The concept of "computer" and "processor" within a computing system also encompasses any such processor or computing device serving to make calculations or comparisons as part of disclosed system.

In some embodiments, the computing system 160 is coupled to a display and/or includes an integrated display. Likewise, displays may be of the same type, or a heterogeneous combination of different visual devices. Although not shown, the computing system 160 may also include one or more operator input devices such as a keyboard or mouse to name just a few representative examples. Also, besides a display, one or more other output devices may be included such as a printer. As such, various display, input and output device arrangements are possible.

The data and operating logic of the system described above can be embodied in signals transmitted over a network, in programming instructions, dedicated hardware, or a combination of these. Thus communications with the system can be achieved by various means such as a wireless or wired Local Area Network (LAN), Municipal Area Network (MAN), Wide Area Network (WAN), such as the Internet, a combination of these, or such other network arrangements as would occur to those skilled in the art. External data sources may also be connected to the system via data access devices connected to these same communications links, or by data access devices may provide data by other means such as via nonvolatile storage devices such as DVD or CD-ROM, flash memory devices, and the like.

In some embodiments, users interact with the system via one or more software applications operating on the computing system 160 which serves HTML pages, sends and receives data via web services, and/or other Internet standard or company proprietary data formats, or maintains dedicated client/server connections in order to facilitate the transfer of information between the user and the system, or between the system and outside datasources. As described above, this interaction can take place over a network such as the internet, a WAN, MAN, LAN, or other suitable electronic communications network. Further, it shall be appreciated that the types of communication methods connected within the above described system need not be of the same type, but that digital, analog, and other technologies may be accommodated simultaneously.

Figure 2:
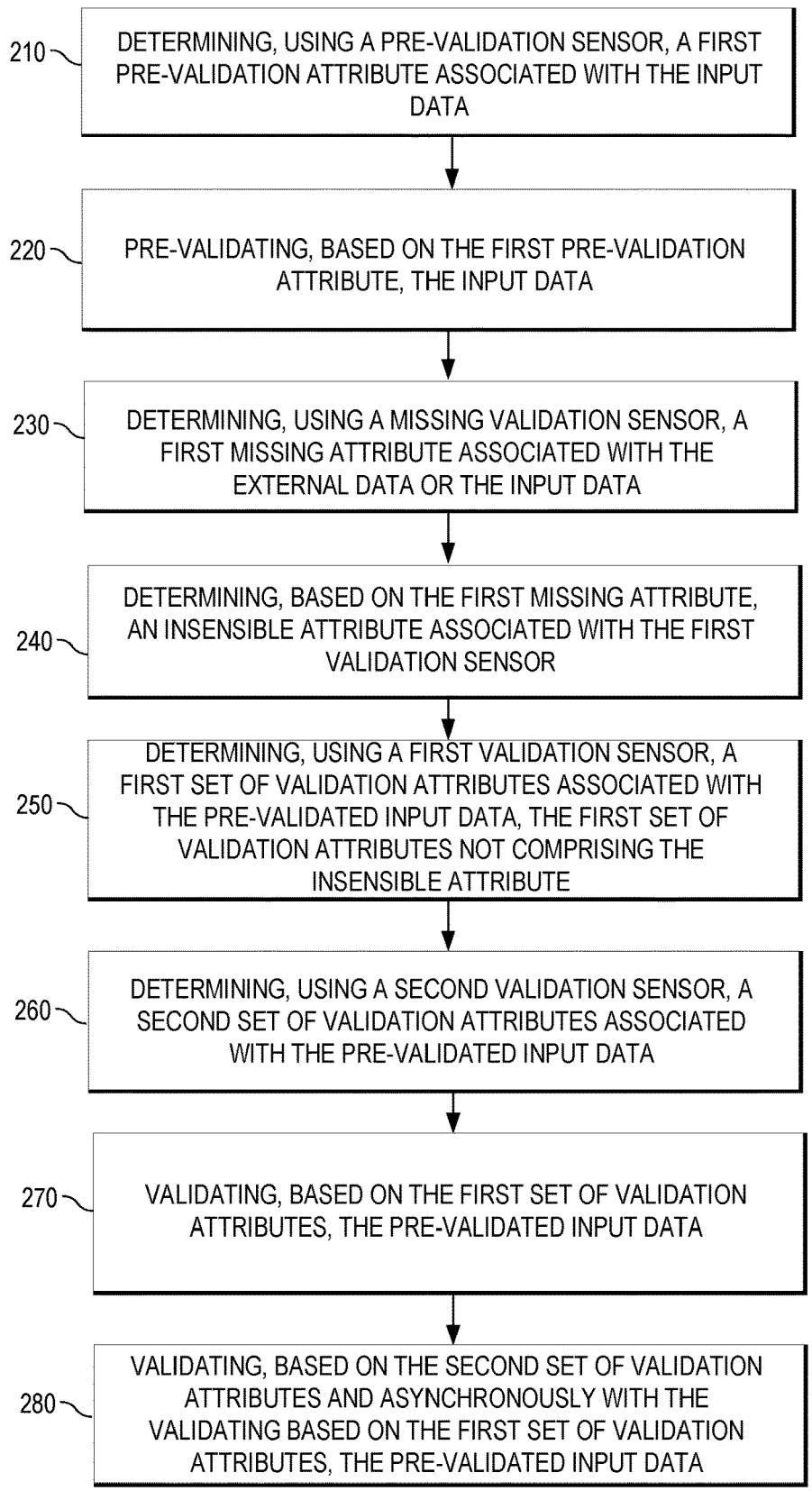
FIG. 2 is a diagram illustrating a method for asynchronous sensing and/or validating of data using a first sensor and a second sensor for a purpose of transforming input data into validated output data when at least one attribute of external data or the input data is missing, in accordance with some embodiments of the disclosure.

FIG. 2 is a diagram illustrating a method for asynchronous sensing and/or validating of data using a first sensor and a second sensor for a purpose of transforming input data into validated output data when at least one attribute of external data or the input data is missing, in accordance with some embodiments of the disclosure. In some embodiments, the input data may be property data such as property appraisal data. However, in other embodiments, the input data may be any other type of data. The disclosure is not limited to any types of input data. External data is obtained from external data systems upon receipt of the input data. External data may be any data that is used to pre-validate and/or validate the input data. The external data may be requested and received based on the received input data. The various terms described herein (e.g., input data, external data, etc.) may be further described in the references incorporated by reference below. At block 210, the method comprises determining, using a pre-validation sensor, a first pre-validation attribute associated with the input data. At block 220, the method comprises pre-validating, based on the first pre-validation attribute, the input data. At block 230, the method comprises determining, using a missing validation sensor, a first missing attribute associated with the external data or the input data. At block 240, the method comprises determining, based on the first missing attribute, an insensible attribute associated with the first validation sensor (and/or either the same insensible attribute or a different insensible attribute associated with the second validation sensor). At block 250, the method comprises determining, using a first validation sensor, a first set of validation attributes associated with the pre-validated input data, the first set of validation attributes not comprising the insensible attribute. At block 260, the method comprises determining, using a second validation sensor, a second set of validation attributes associated with the pre-validated input data. In some embodiments, the second set of validation attributes may not comprise an insensible attribute associated with the second validation sensor. At block 270, the method comprises validating, based on the first set of validation attributes, the pre-validated input data. At block 280, the method comprises validating, based on the second set of validation attributes and asynchronously with the validating based on the first set of validation attributes, the pre-validated input data. In some embodiments, the method further comprises validating, based on a missing attribute such as the first missing attribute, the pre-validated input data. In some embodiments, the method further comprises determining, based on the first missing attribute, a quality of the validated data. For example, an indicator (e.g., a graphical indicator) may be provided indicating the degree of validity of the validated data. The indicator may be based on the quantity and type of missing attributes. In some embodiments, the method further comprises integrating the validated data based on the first set of validation attributes and the validated data based on the second set of validation attributes.

The present application incorporates-by-reference the entirety of U.S. application Ser. No. 13/675,195, filed Nov. 13, 2012, titled "Determination of Appraisal Accuracy," for all purposes. Para. [0076] of US 2013/0290195 associated with U.S. application Ser. No. 13/675,195 notes that if a hard stop is found, it is noted with a red stop sign. In some new embodiments, the hard stop may be noted with a red flag symbol instead of a red stop sign. In some new embodiments, the shape of the flag may be triangular, square, hexagonal, octagonal, or circular. Additionally, in some new embodiments, the system may determine the presence of red flags instead of hard stops. Additionally, in some new embodiments, an action is not recommended based on the appraisal risk (para. [0066] of US 2013/0290195 associated with U.S. application Ser. No. 13/675,195), and therefore, the recommended action may not contribute to the overall report score described in para. [0070] of US 2013/0290195 associated with U.S. application Ser. No. 13/675,195.

The present application incorporates-by-reference the entirety of U.S. application Ser. No. 13/458,893, filed Apr. 27, 2012, titled "Determination of Appraisal Accuracy," for all purposes. The present application incorporates-by-reference the entirety of U.S. Provisional Application No. 61/480,909, filed Apr. 29, 2011, titled "Determination of Appraisal Accuracy," for all purposes.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

What is claimed is:

1. A system for parallel sensing and validating of data using a first sensor and a second sensor for a purpose of transforming input data into validated output data when at least one attribute of external data or the input data is missing, the external data being associated with the input data and being used for determining a set of attributes for the first sensor, wherein the parallel sensing and validating of the input data enables faster transforming of the input data into the validated output data, the system comprising:
    a data communication interface for:
       establishing a first connection to an input data system;
       receiving, on the first connection, input data from the input data system;
       establishing a second connection to an external data system; and
       receiving, on the second connection, external data from the external data system, the external data being associated with the input data;
    a pre-validation sensor for
       sensing a first pre-validation attribute associated with the input data;
    a missing-attribute validation sensor for:
       sensing a first missing attribute associated with the external data or the input data;
    a first validation sensor for:
       sensing a first validation attribute associated with pre-validated input data;
    a second validation sensor for:
       sensing, in parallel with the sensing of the first validation attribute by the first validation sensor, a second validation attribute associated with the pre-validated input data;
    a chipset and interfaced with a processor, the chipset having hardware for supporting the first connection to the input data system, and the second connection to the external data system; and
    the processor for:
       determining, using the pre-validation sensor, the first pre-validation attribute associated with the input data;
       pre-validating, based on the first pre-validation attribute, the input data;
       determining, using the missing-attribute validation sensor, the first missing attribute associated with the external data or the input data;
       determining, based on the first missing attribute, an insensible attribute associated with the first validation sensor;
       determining, using the first validation sensor, a first set of validation attributes associated with the pre-validated input data, the first set of validation attributes not comprising the insensible attribute;
       determining, using the second validation sensor, a second set of validation attributes associated with the pre-validated input data;
       validating, based on the first set of validation attributes, the pre-validated input data; and
       validating, based on the second set of validation attributes and in parallel with the validating based on the first set of validation attributes, the pre-validated input data.

2. The system of claim 1, wherein the data communication interface is further for:
    establishing a third connection to an output data system; and
    transmitting, on the third connection, output data to the output data system, wherein the hardware further supports a third connection to the output data system.

3. The system of claim 2, wherein the first connection and the third connection comprise the same connection.

4. The system of claim 1, wherein the first connection and the second connection comprise the same connection.

5. The system of claim 1, wherein the processor is further for: validating, based on the first missing attribute, the pre-validated input data.

6. The system of claim 1, wherein the processor is further for: determining, based on the first missing attribute, a quality of the validated data.

7. The system of claim 1, wherein the processor is further for: indicating, using a graphical indicator, a degree of validity of the validated data.

8. The system of claim 7, wherein the graphical indicator comprises a red flag.

9. The system of claim 1, wherein the input data comprises at least some external data.

10. The system of claim 1, wherein no dependency exists between the first sensor and the second sensor.

11. The system of claim 1, wherein the processor is further for: integrating the validated data based on the first set of validation attributes and the validated data based on the second set of validation attributes.

12. The system of claim 1, wherein the processor is further for: requesting and receiving the external data based on the input data.

13. A method for parallel sensing and validating of data using a first sensor and a second sensor for transforming input data into validated output data when at least one attribute of external data or the input data is missing, the external data being associated with the input data and being used for determining a set of attributes for the first sensor, the method comprising:
    establishing a first connection to an input data system;
    receiving, on the first connection, input data from the input data system;
    establishing a second connection to an external data system; and
    receiving, on the second connection, external data from the external data system, the external data being associated with the input data;
    sensing, using a pre-validation sensor, a first pre-validation attribute associated with the input data;
    sensing, using a missing-attribute validation sensor, a first missing attribute associated with the external data or the input data;
    sensing, using a first validation sensor, a first validation attribute associated with pre-validated input data;
    sensing, using a second validation sensor, in parallel with the sensing of the first validation attribute by the first validation sensor, a second validation attribute associated with the pre-validated input data;

determining, using the pre-validation sensor, the first pre-validation attribute associated with the input data;

pre-validating, based on the first pre-validation attribute, the input data;

determining, using the missing-attribute validation sensor, the first missing attribute associated with the external data or the input data;

determining, based on the first missing attribute, an insensible attribute associated with the first validation sensor;

determining, using the first validation sensor, a first set of validation attributes associated with the pre-validated input data, the first set of validation attributes not comprising the insensible attribute;

determining, using the second validation sensor, a second set of validation attributes associated with the pre-validated input data;

validating, based on the first set of validation attributes, the pre-validated input data; and validating, based on the second set of validation attributes and in parallel with the validating based on the first set of validation attributes, the pre-validated input data.

14. The method of claim 13, wherein the input data comprises at least some external data.

15. The method of claim 13, wherein no dependency exists between the first sensor and the second sensor.

16. The method of claim 13, wherein the first connection and the second connection comprise the same connection.

17. A non-transitory computer readable medium comprising code configured for parallel sensing and validating of data using a first sensor and a second sensor for transforming input data into validated output data when at least one attribute of external data or the input data is missing, the external data being associated with the input data and being used for determining a set of attributes for the first sensor, the code configured for:

establishing a first connection to an input data system;

receiving, on the first connection, input data from the input data system;

establishing a second connection to an external data system; and receiving, on the second connection, external data from the external data system, the external data being associated with the input data;

sensing, using a pre-validation sensor, a first pre-validation attribute associated with the input data;

sensing, using a missing-attribute validation sensor, a first missing attribute associated with the external data or the input data;

sensing, using a first validation sensor, a first validation attribute associated with pre-validated input data;

sensing, using a second validation sensor, in parallel with the sensing of the first validation attribute by the first validation sensor, a second validation attribute associated with the pre-validated input data;

determining, using the pre-validation sensor, the first pre-validation attribute associated with the input data;

pre-validating, based on the first pre-validation attribute, the input data;

determining, using the missing-attribute validation sensor, the first missing attribute associated with the external data or the input data;

determining, based on the first missing attribute, an insensible attribute associated with the first validation sensor;

determining, using the first validation sensor, a first set of validation attributes associated with the pre-validated input data, the first set of validation attributes not comprising the insensible attribute;

determining, using the second validation sensor, a second set of validation attributes associated with the pre-validated input data;

validating, based on the first set of validation attributes, the pre-validated input data; and validating, based on the second set of validation attributes and in parallel with the validating based on the first set of validation attributes, the pre-validated input data.

18. The non-transitory computer readable medium of claim 17, wherein the input data comprises at least some external data.

19. The non-transitory computer readable medium of claim 17, wherein no dependency exists between the first sensor and the second sensor.

20. The non-transitory computer readable medium of claim 17, wherein the first connection and the second connection comprise the same connection.

* * * * *